United States Patent
Eckendorff (10) Patent No.: US 6,779,841 B2
(45) Date of Patent: Aug. 24, 2004

(54) MOTOR VEHICLE SEAT ADAPTED TO RECEIVE A SAFETY BELT

(75) Inventor: Jean-Pierre Eckendorff, Claville (FR)

(73) Assignee: Societe de Recherches d'etudes et de Valorisation, Claville (FR)

( * ) Notice: Subject to any disclaimer, the term of this patent is extended or adjusted under 35 U.S.C. 154(b) by 0 days.

(21) Appl. No.: 10/220,423

(22) PCT Filed: Mar. 1, 2001

(86) PCT No.: PCT/FR01/00611

§ 371 (c)(1),
(2), (4) Date: Sep. 3, 2002

(87) PCT Pub. No.: WO01/64470

PCT Pub. Date: Sep. 7, 2001

(65) Prior Publication Data

US 2003/0020306 A1 Jan. 30, 2003

(30) Foreign Application Priority Data

Mar. 3, 2000 (FR) ............................................. 00 02762
Apr. 8, 2000 (FR) ............................................. 00 10313

(51) Int. Cl.⁷ ................................................. B60N 2/42
(52) U.S. Cl. ................................. 297/216.13; 297/452.2
(58) Field of Search ......................... 297/216.1, 216.13, 297/216.14, 452.2, 452.18, 301.3

(56) References Cited

U.S. PATENT DOCUMENTS

| 4,688,662 A | | 8/1987 | Correll |
| 4,938,532 A | * | 7/1990 | Burgess |
| 5,938,265 A | * | 8/1999 | Oyabu et al. |
| 6,065,803 A | * | 5/2000 | Li et al. |

FOREIGN PATENT DOCUMENTS

| DE | 196 30 325 | 3/1997 |
| DE | 196 48 974 | 5/1997 |
| DE | 199 16 361 | 10/1999 |
| FR | 2 557 992 | 7/1985 |
| NL | 47 716 | 4/1939 |

* cited by examiner

Primary Examiner—Milton Nelson, Jr.
(74) Attorney, Agent, or Firm—Young & Thompson (57) ABSTRACT

A motor vehicle seat adapted to receive a safety belt includes a seating part and a back part on either side of an articulation zone. Each of the parts includes a frame with two arms abutting the articulation zone, the two arms forming respectively side members for the seat and vertical members for the back: the ends of the two arms of one of the parts and the ends of the two arms of the part are mounted each rotating via a pivot in a bearing. The pivot is borne by one part and the bearing by the other part, and an energy-absorbing element is provided between at least a pivot and its corresponding bearing.

22 Claims, 7 Drawing Sheets

MOTOR VEHICLE SEAT ADAPTED TO RECEIVE A SAFETY BELT

The present invention relates to a motor vehicle seat designed to receive a safety belt and comprising a seat part and a back part on either side of a hinging zone, each of the said parts having a frame with two arms terminating at the hinging zone, the two arms forming respectively seat side members and back upright members.

Hinging mechanisms of motor vehicle seats permitting adjustment of the slope of the back part are not designed to withstand large forces transmitted by the safety belts in the case of an accident. Transmission of these forces would necessitate considerable overdimensioning of these mechanisms.

That is why, generally, the high anchorage point of the belt is not fixed to the seat but to the vehicle body, generally arranged at floor level by the lateral columns, called pillars, of the body structure. This layout requires arrangement of the fixing points and separate, successive installation of the seats and belts, which increases the assembly times on the assembly line.

It is even more difficult to choose the high anchorage point for the removable seats of vehicles of the people-carrier or utility type.

Moreover, the offset position of a high anchorage point fixed on the back part relative to the axial plane of the seat promotes deformation by twisting of the said back part, greatly reducing its capacity for absorbing a tensile stress on the anchorage point of the safety belt.

The present invention relates to a seat in which the force transmitted mainly by a single upright member of the back part receiving the high anchorage of the safety belt is distributed equally on the two seat side members of the seat to withstand dynamic forces of the order of 400 decanewton-meter; owing to this arrangement, the safety belts can be installed forming an integral subassembly of the seat.

According to the invention, a motor vehicle seat designed to receive a safety belt and comprising a seat part and a back part on either side of a hinging zone, each of the said parts having a frame with two arms terminating at the hinging zone, the two arms forming respectively seat side members and back upright members, is characterized in that the ends of the two arms of one of the said parts and the ends of the two arms of the other part are each mounted with rotation by means of a pivot in a bearing, the pivot being carried by one part and the bearing by the other part, a means of absorbing energy being provided between at least one pivot and its corresponding bearing.

Advantageously, a stiffening crosspiece is arranged between the pivots carried by the ends of the arm of the said one of the parts.

Preferably, the energy absorbing means has at least one elastic element.

Advantageously, the energy absorbing means has two elastic elements that are designed to come into operation, one instantly without any play, and the other deferred after a travel determined by an amount of play.

Preferably, the elastic means whose operation is deferred is provided with a certain amount of play in one direction and a different amount of play in the other direction.

Advantageously, as the crosspiece is tubular, the energy absorbing means is arranged inside the said crosspiece.

Preferably, the absorbing means has at least one torsion bar with one of its ends fixed in one of the bearings and connected by a coupling block to the tubular crosspiece.

Advantageously, the tubular crosspiece with overall cylindrical shape has at least one helical rail that cooperates with at least one corresponding groove arranged on the coupling block, and the torsion bar that passes through this block with a non-circular cross-section blocks any relative rotary movement between block and bar, but permits their relative free sliding.

Preferably, the block has a tapped through-hole, and a screw parallel to the axis, free to rotate but blocked in translation and accessible from the outside by at least one of its ends constitutes a means of so-called continuous fine adjustment of the slope of the back part.

Advantageously, the said screw is able to be operated by one and/or the other of its ends.

Preferably, the torsion bar of non-circular cross-section has one of its ends fixed in a bearing, and is engaged by its other end in a housing provided in the other bearing with a similar shape but of larger dimensions so as to block that other end in rotation only beyond a certain angle of rotation.

Advantageously, the torsion bar of square cross-section has its other end engaged in a housing with a cross-section delimited by two squares centred on the axis and with an angular offset with a predetermined angle of displacement, the rotational displacement of each vertex of the bar's cross-section being delimited by two flat bearing surfaces connected following a circular arc with diameter at least equal to the diagonal of the square of the bar's cross-section.

Preferably, a difference provided between the distances separating the coupling block of the two ends of the bar is utilized as a means of acting upon the distribution of the stresses applied in case of impacts on the seat side members.

Advantageously, sleeves inserted in the tubular crosspiece or fitted on the torsion bar limit the axial displacements of the coupling block.

Preferably, sleeves fitted on the torsion bar provide guidance of the control rod of the block.

Advantageously, the said at least one helical rail extends over a fraction of the length of the crosspiece.

Preferably, one of the ends of the said rail is configured as a stop that limits the axial displacement of the block, whereas the other end is configured to facilitate the introduction of the block.

Advantageously, a device for manual selection of the angle of slope of the back part is interposed between at least one of the bearings carrying the said one of the parts and the end of the corresponding arm of the said other part.

Preferably, the device for selecting the angle of slope of the back part having a limited number of positions for angular blocking, the means for fine adjustment is designed for continuous coverage of a range of adjustment over an angular extent greater than the difference separating two successive positions for angular blocking of the selecting device.

Advantageously, the, or each, energy absorbing means is an elastic element that is designed to undergo a permanent deformation in case of impact.

Preferably, the elastic element is divided into at least two parts, one at least of these parts having been treated to modify its elastic limit.

Advantageously, the ends of the two upright members of the back part being joined together solidly by the stiffening crosspiece whose ends, extending outside of the upright members of the back part, form hinging pivots in two bearings fitted on said ends, each of these bearings has, in relief on its external face, a blocking means that is able to cooperate by complementarity of shape with a receiving means provided in the hinging zone of the corresponding seat side member.

For a better understanding of the object of the invention, embodiments shown in the appended drawings will now be described, as purely illustrative, non-limiting examples.

Figures 1, 3:
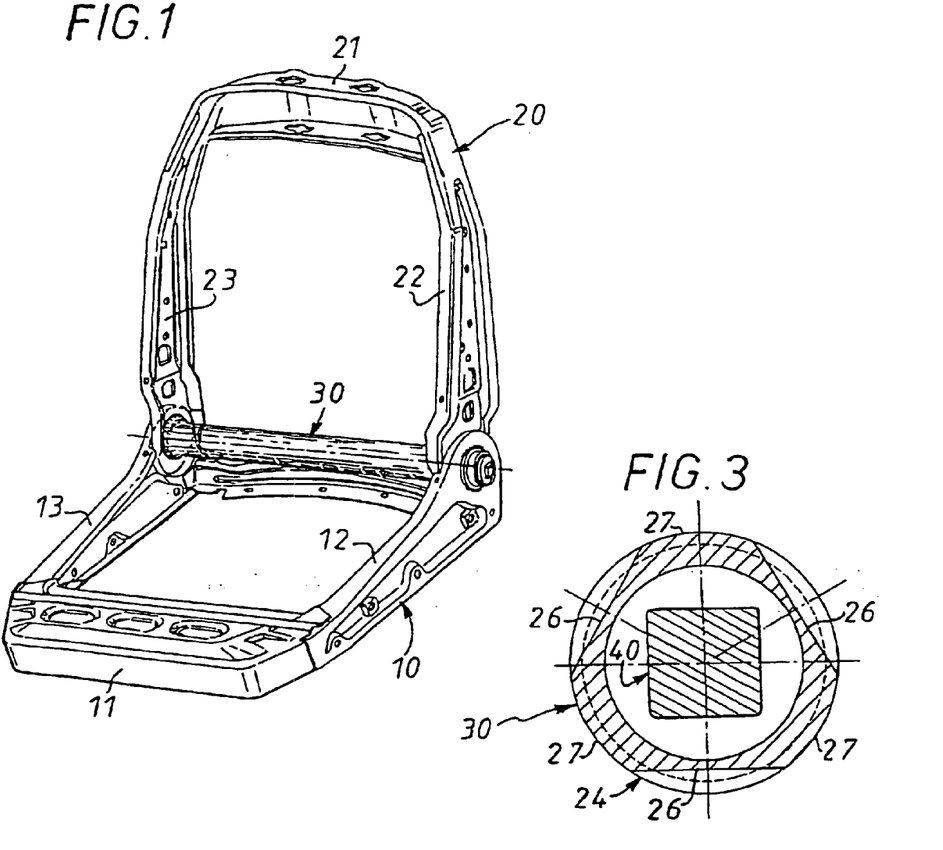
FIG. 1 is a perspective view of a seat according to the invention.
FIG. 3 is a view along III—III in FIG. 2.
Figure 2:
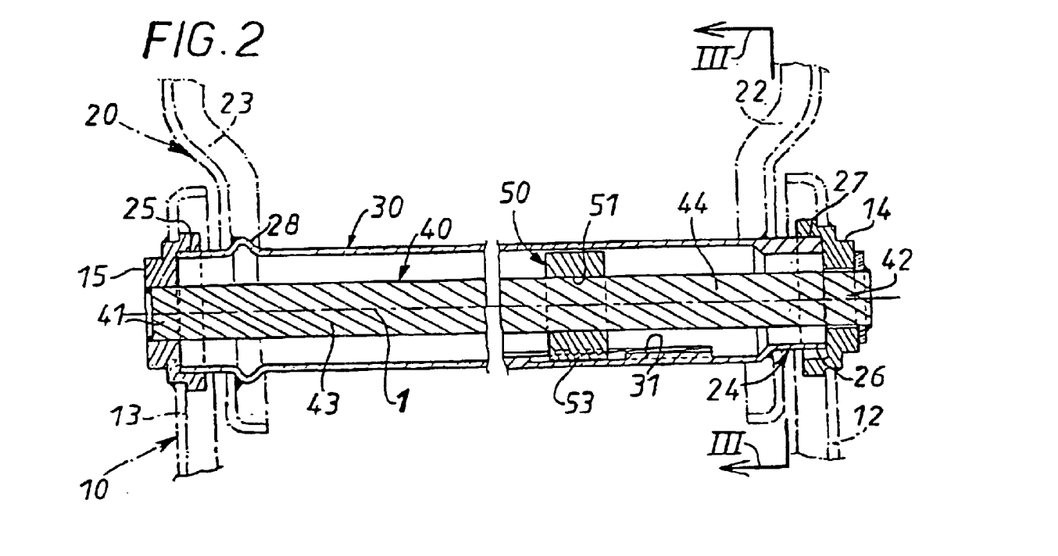
FIG. 2 is a partial section view of the hinging zone of the seat in FIG. 1.

Referring to FIGS. 1 and 2, it can be seen that a motor vehicle seat comprises a seat part 10 and a back part 20.

The seat part 10 has a U frame whose centre part 11 joins two arms forming side members 12 and 13; similarly, the back part 20 has a U frame whose centre part 21 joins two arms forming upright members 22 and 23.

The ends of the two arms of one of the parts are mounted with rotation relative to the ends of the two arms of the other part, respectively, about the hinging axis 1.

Here, the ends of the seat side members 12, 13 carry bearings 14, 15 in which are mounted, with rotation, pivots 24, 25 carried by the ends of the back upright members 22, 23.

In the form described and shown, pivots 24, 25 are constituted by the ends of a stiffening crosspiece 30 joining the ends of the upright members 22, 23 of the back part 20 and it is joined to them, in this case by welding.

The crosspiece 30, of tubular form, is advantageously made by methods of cold work on a mandrel, by which it is possible to accurately produce such a component having local increases in thickness.

Here, the end 24 comprises three flats 26 between three turned cylindrical bearing surfaces 27; the flats 26 facilitate the positioning and welding of the said end 24 to the upright member 22. The other end of the crosspiece 30, namely the end 25, is cylindrical and is limited axially by a local increase 28 in diameter that facilitates the positioning and welding of this end 25 to the upright member 23.

On at least one part of its length, the crosspiece 30 is provided with internal ribs 31 for example three in number regularly spaced at 120°.

These ribs 31 cooperate with grooves 53 arranged on the outside surface of a block 50.

The block 50 is firmly fixed in rotation with a torsion bar 40; to achieve this, here the bar 40 is of square section and so too is the through-hole 51 of the block 50 that receives the said bar 40.

One of the ends of the torsion bar 40, the end 41, is fixed to a bearing 15, thus fixed in rotation here, and is immobilized in translation by being welded to the said bearing 15; the other end 42 is free in rotation relative to the bearing 14; it can be stopped axially, as is shown, by a washer butt-welded to the bar 40 whose end 42 projects relative to the bearing 14.

Thus, by means of the bearing 15 and the crosspiece 30, the torsion bar 40 constitutes a means of absorbing energy, via a block 50, arranged between the back part 20 and the seat part 10 and intended to absorb the energy of impact in the case of a collision, the back part 20 then being urged to move relative to the back part 10 by the so-called "on-board" safety belt carried by the seat.

Of course, it is possible for the two portions of the bar 40 on either side of the block 50 to be caused to participate in energy absorption.

Thus, according to a first variant not shown, the two ends 41 and 42 of the bar 40 are fixed to the bearings 13 and 14, respectively.

Figure 4:
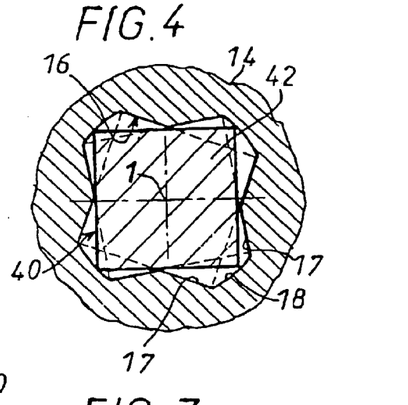
FIG. 4 is a partial section view of a variant of the end of the hinging zone of the seat in FIGS. 1 to 3.

It is also possible for the said participation to be postponed: FIG. 4 shows a variant of the bearing 14 according to which the cross-section of the housing 16 that receives the square end 42 of the bar 40 is delimited by two squares centred on an axis 1 and with an angular shift by a defined displacement angle; thus, the displacement of each vertex of the square of the cross-section of the bar 40 is limited by two flat bearing surfaces 17 which cooperate with the sides of the said square; the flat bearing surfaces 17 are joined for example at 18 along a circular arc, with its centre at the axis; of course, the diameter of this circle is at least equal to the length of a diagonal of the square of the cross-section of the bar 40.

The displacement thus permitted is for example 39°; at rest, the back part is positioned so that it has a possibility of displacement in both directions; in the case of a front impact, the end 42 of the bar makes contact with a face 17 of the housing of the bearing 14 after a displacement of 13° and in the case of a rear impact it makes contact with a face 17 after a displacement of 26°.

The back part 20 can thus be made to transmit to the bar 40, via the block 50, a torque estimated for example at 400 decanewton-meter without exceeding a maximum angle of for example 26° both forwards during a front impact and backwards during a rear impact.

According to one embodiment, the block 50 is not mid-way along the bar 40; the length of the portion 43, FIG. 2, whose end 41 is mounted fixed relative to the bearing 15, is twice that of the portion 44, whose end 42 is mounted with the possibility of displacement, FIG. 4, relative to the bearing 14; owing to this arrangement, as the angular twist of a torsion bar is proportional both to the torque to be transmitted and to the stressed length of the bar, during a front impact, after the first 13° of displacement, the bearing 15 is subjected to 100 decanewton-meter transmitted by the first portion 43 whereas the second portion 44 does not transmit any torque to the bearing 14; after the permitted 260 of displacement, the first portion 43 transmits 100 decanewton-meter more, i.e. a total of 200 decanewton-meter, and the second portion 44 being half as long as portion 43 transmits for this same angle of 13°, in the range between +13° and +26°, the same force of 200 decanewton-meter.

In the case of a rear impact, after the 26° of displacement, the first portion 43 transmits 200 decanewton-meter whereas the second portion 44 does not transmit any torque to the bearing 14; beyond the said force, the portion 44 comes up against its end 42 and comes into operation for safety reasons.

As can be seen, a difference that is provided between the distances separating the coupling block 50 from the two ends 41, 42 of the bar 40 is utilized as a means of acting upon the distribution of stresses applied in the case of impacts on the seat side members 12, 13.

The arrangement according to the invention also has the advantage of permitting adjustment of the relative angular position of the seat part 10 and the back part 20.

Figure 5:
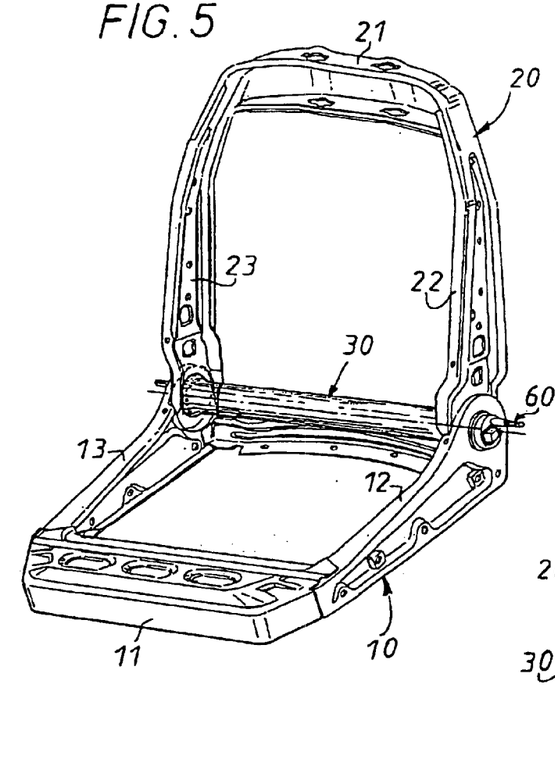
FIG. 5 is a view similar to FIG. 1 and relates to a variant of the seat according to the invention.
Figure 6:
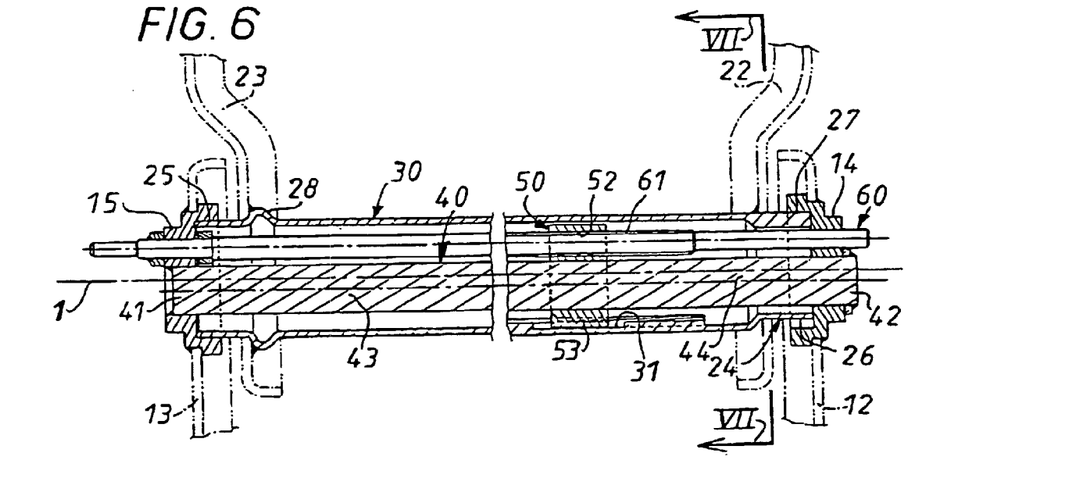
FIG. 6 is a partial section view of the hinging zone of the seat in FIG. 5.
Figure 7:
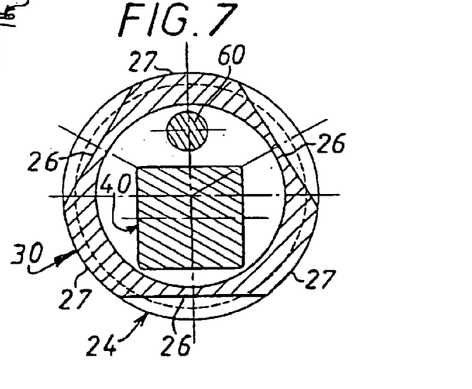
FIG. 7 is a view along VII—VII in FIG. 6.

Thus, referring to FIGS. 5 to 7, it can be seen that the torsion bar 40 has been offset radially relative to the hinging axis 1 to permit the interposing, between itself and the inside wall of the crosspiece 30, of means of adjusting the axial position of the block 50, in this case a threaded rod 60 whose thread 61 cooperates in screwing with an internal thread 52 running through the block 50; advantageously, the ends of the adjusting rod 60 pass through the bearings 14, 15 which they go beyond so that the rod 60 can be grasped from either side of the seat.

Here, the internal ribs 31 of the crosspiece 30 are rails of helical type, as are also of course the external grooves 53 of the block 50.

As is easily understood, by turning the axially-offset adjusting rod 60, the block 50 is displaced axially relative to the crosspiece 30; because of the rails 31, the said block 50, which is prevented from turning relative to the torsion bar 40 locked on the bearings 14, 15 which are in turn locked on the seat side members 12, 13, causes rotation of the crosspiece 30 and therefore of the upright members 22, 23 to which the latter is connected.

By choosing an extended pitch for the helical rails 31 so that they have a small helix angle absorbing a minimum of force and an appropriate pitch for the screw permitting a considerable reduction of the axial displacement of block 50, we obtain an angular adjustment of the back part 20 that is continuous, linear and very accurate.

This type of adjustment by rotation of a rod means that known devices for electrically-operated seat adjustment can easily be adapted to it.

When operation is manual, it is desirable that the operation of a knurled knob for example is effected in the same sense of rotation as that required for inclining the back part. This result is obtained very easily by combining a left- or right-hand thread 61 of the threaded rod 60 with a right- or left-hand thread of the helical rails 31 of the crosspiece 30.

Such an arrangement is very suitable for the seats used in public service vehicles having a back part whose angle of adjustment is generally limited.

For a larger angle, it is advantageous to combine continuous adjustment by an adjusting rod as above, and an adjustment of the stepwise type.

Figure 8:
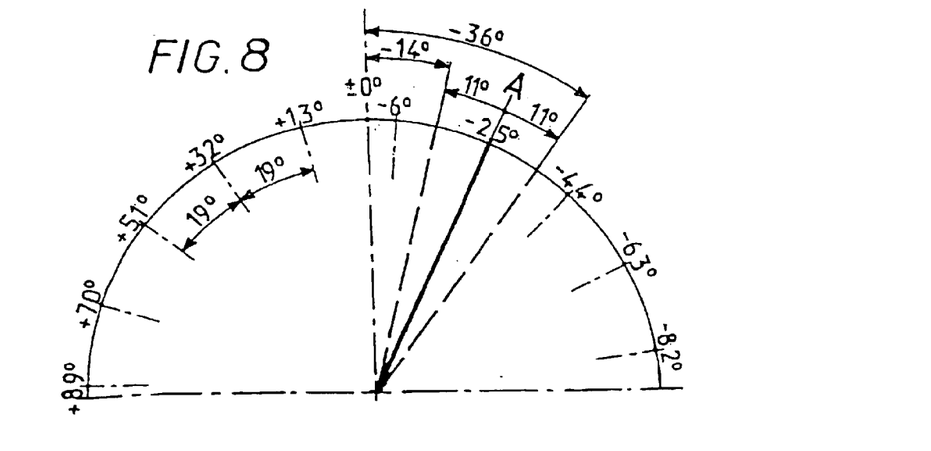
FIG. 8 is a diagram illustrating the positions of adjustment of the slope of the back part relative to the seat part of a seat according to the invention.

The diagram of angular positions in FIG. 8 shows an example of mixed manual seat back adjustment, comprising a stepwise adjustment, of a known type, in steps of 19° and a continuous linear adjustment according to the invention of approximately 11° at any position, only requiring an operation of roughly 3 turns of the adjusting rod. In order to cover the whole range of adjustment angle envisaged, continuous adjustment according to the invention will have a range for example of 22°, i.e. slightly greater than the pitch between two successive positions of the stepwise adjustment, here for example 19°. The axis A of the reference pitch will preferably correspond to the standard angle of 25° typical of the usual reference position of a seat back. The continuous adjustment will have a sweep of roughly 11° relative to the said angle and thus will cover the normal positions of use with a limited number of operating turns. For larger angular displacements backwards, to the "relax" or "sleep" positions, or forwards, mainly to provide access to the rear seats in two-door vehicles, stepwise adjustment can be used on its own, without any need to use the continuous adjustment, which nevertheless remains available for correcting the locking points of the stepwise adjustment. Advantageously a memory system is provided for automatically stopping the seat back in the standard position of 25°. Provision of an interlock of the continuous adjustment is also a possibility, so that it can only be used for the standard position of 25°, in ranges of roughly 11°.

Figure 9:
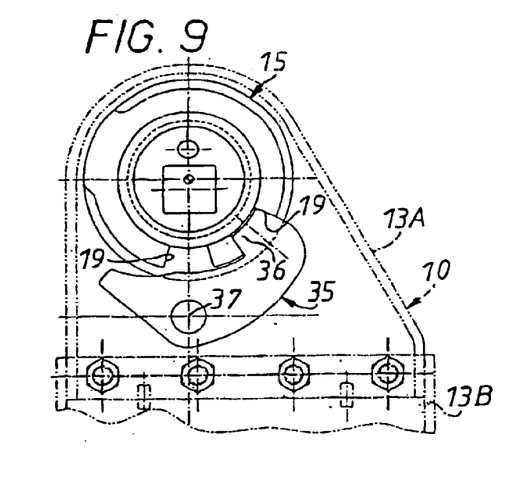
FIG. 9 is a partial end view showing a means for stepwise adjustment of the back part.
Figure 10:
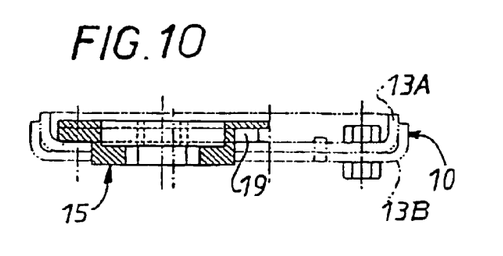
FIG. 10 is a partial section view relative to FIG. 9, the catch not being shown.

FIGS. 9 and 10 show succinctly an example of a device for stepwise adjustment.

In these diagrams, a side member of the seat part 10, here in two pieces 13A and 13B, carries a bearing 15 which is not fixed rigidly to the said side member but can be immobilized relative to it in various positions, in this case in two positions: to achieve this, two channels 19 are intended to receive the tip of a catch 35 mounted with rotation about an axis 37.

Owing to the presence of the continuous adjustment described above, the positions corresponding to the stepwise adjustment can be spaced apart so that, in the example shown, the tip 36 and the material that separates the channels 19 can have a considerable circumferential development so as to be able to withstand the stresses induced during an impact.

In the examples described and illustrated, the torsion bar 40 is solid and of square cross-section; variants are of course possible.

Figure 11:
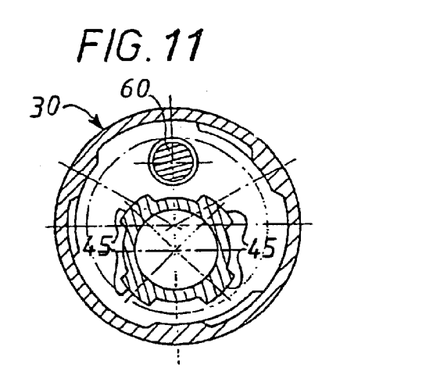
FIGS. 11 and 12 are partial section views showing variants of cross-section of the torsion bar.
Figure 12:
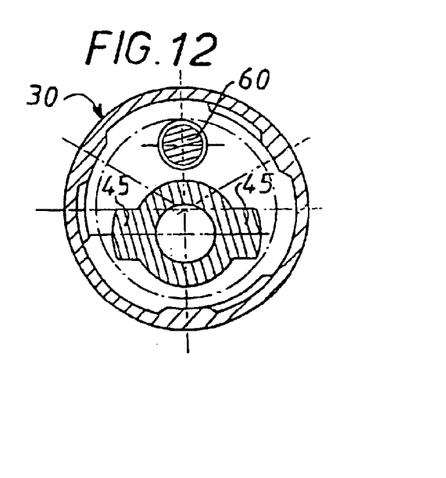

Obviously it is sufficient for its outside wall not to be circular; FIGS. 11 and 12 show hollow torsion bars with longitudinal flutes 45, four flutes in FIG. 11 or two flutes in FIG. 12.

Figure 13:
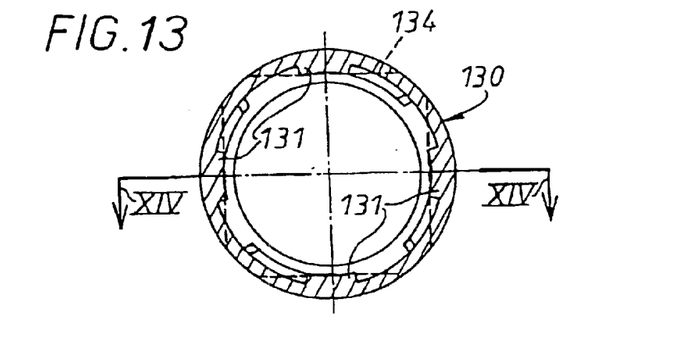
FIGS. 13 and 14 show a variant of a crosspiece according to the invention, FIG. 14 being a view along XIV—XIV in FIG. 13.
Figure 14:
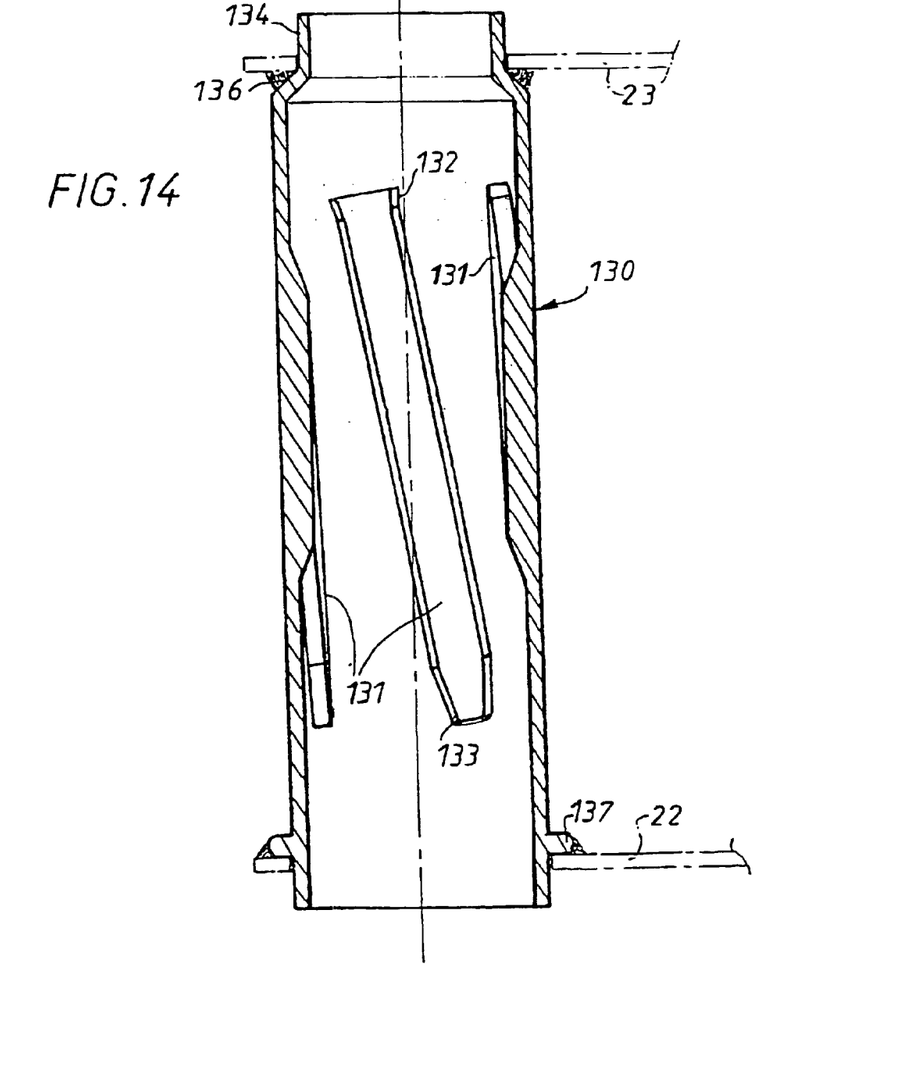

FIGS. 13 and 14 show a variant of a crosspiece. Here, a crosspiece 130, made by methods of cold work on a mandrel, comprises four helical rails 131 extending over a part of the length of the said crosspiece 130; one end 132 of the rails 131 is broadened to form an end-of-travel stop for the block 50, whereas the other end 133 is bevelled to facilitate engagement of the said block 50.

A polygonal section 134 is provided at one end of the crosspiece 130 by an operation of swaging on a cylindrical mandrel to form a pivot; this end is of variable thickness: greater at the corners of the polygon than in the middle of the flats.

The polygonal section is indexed relative to the rails 131 so that the back part 20, after assembly, slopes backwards at 25° to the vertical, as is customary.

In the example shown, the polygonal section 134 is a square with rounded corners serving as a pivot, shown in dashed line in FIG. 13; as the four rails 131 and the square are arranged according to rotational symmetry, the crosspiece 130 can be positioned equally in four of its angular positions.

Thus, advantageously, the polygonal section is a polygon having a number of faces equal to the number of rails uniformly distributed circumferentially.

The connections 136, by which the polygonal section 134 is connected to the external surface of the crosspiece 130, form a stop for axial positioning of the latter relative to the upright member 23 of the back part 20; at the other end, this function is provided, with respect to the other upright member 22, by a flange 137.

Figures 15, 16, 17, 19:
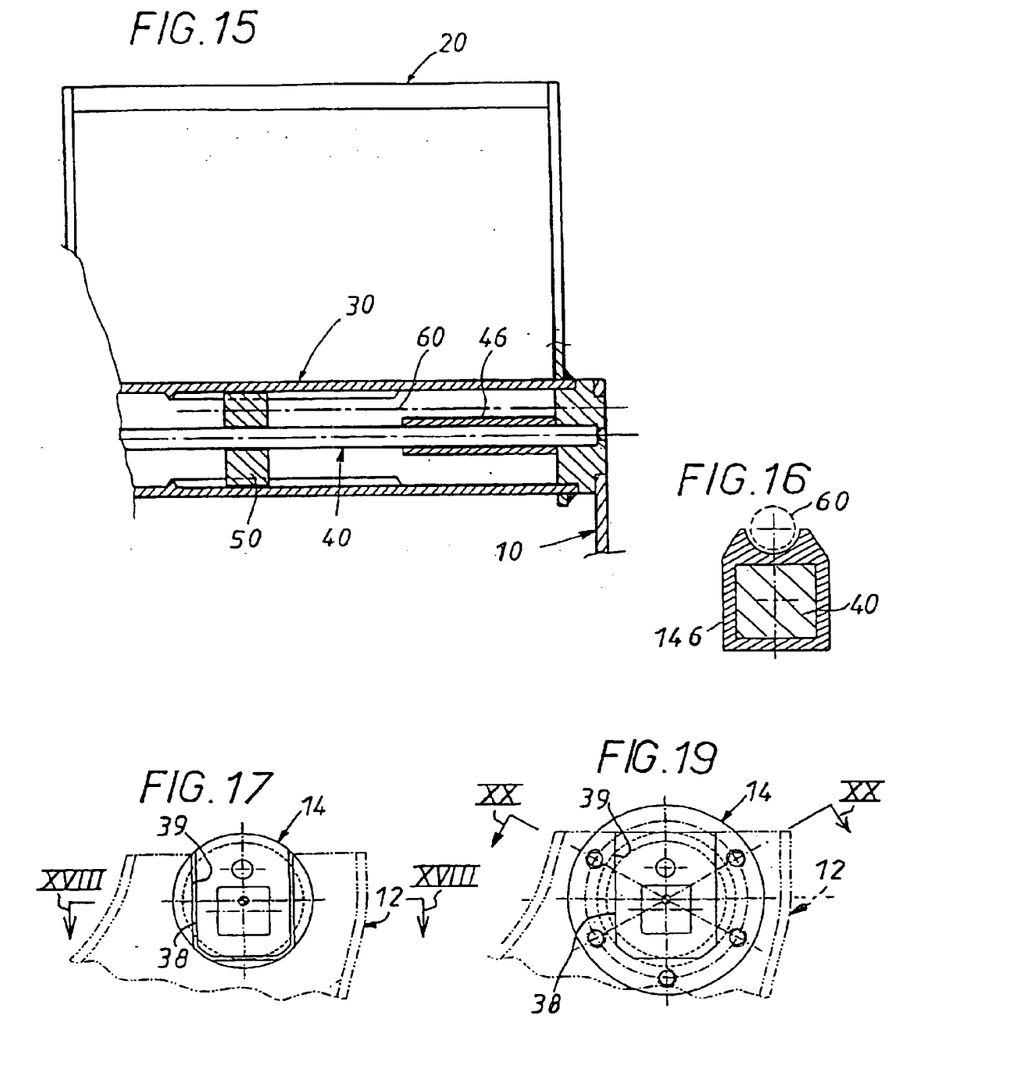
FIGS. 15 and 16 are partial section views showing means for limiting the travel of the block and for guiding the adjusting rod, respectively.
FIG. 17 is a partial view showing the assembly of the back part on the seat part.
FIGS. 19 and 20 are views similar to FIGS. 17 and 18, respectively, showing a variant of assembly.

Means other than the broadened end 132 of the rails 131 can be provided for axially limiting the axial displacement of the block 50; in FIG. 15, a sleeve 46, having the same shape as the torsion bar, is provided; sleeves 46 of different lengths make it possible to vary the stop position of the block 50.

The sleeve, such as the sleeve 146 in FIG. 16, can be arranged in such a way that it also provides guidance of the adjusting rod 60.

Other means for stopping the block 50 are possible, such as stops applied directly on the crosspiece 30, for example screws, or sleeves inserted with force in the crosspiece 30.

When the ends of the two upright members 22, 23 of the back part 20, FIG. 2, are joined together by the stiffening crosspiece 30, and the ends of the latter, which project from the said upright members 22 and 23, form pivots 24, 25 for hinging in the two bearings 14, 15 mounted on the said ends, it is advantageous to equip the said bearings 14, 15 with engaging means, FIGS. 17 to 20, extending in relief on their external face and able to cooperate by complementarity of shape with a receiving means provided in the hinging zone of the corresponding seat side member 12 or 13, the said receiving means preferably being accessible vertically; owing to this arrangement, it is possible to construct a subassembly comprising the back part 20, the crosspiece 30 and what is associated with it, as well as the bearings 14, 15; it is then possible to mount the seat in the vehicle by first installing the seat part 10 then by fitting the back subassembly by lowering the engaging means of the said subassembly into the receiving means provided on the side members 12, 13; all that is then required is to join together the engaging means and the receiving means.

Figure 18:
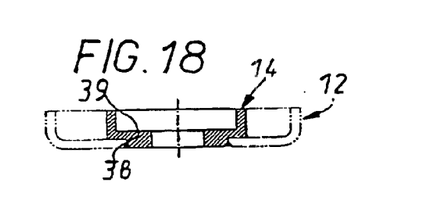
FIG. 18 is a partial section view relative to FIG. 17.

In FIGS. 17 and 18, the engaging means 38 is a projection of rectangular general shape and the receiving means 39 is a channel with the same overall shape. Here, the engaging means 38 and the receiving means 39 are joined together by welding.

Figure 20:
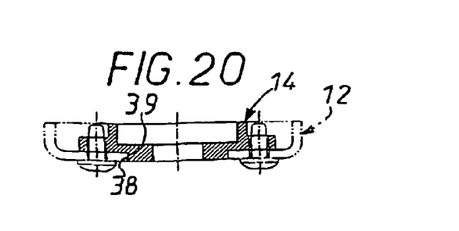

In FIGS. 19 and 20, the engaging and receiving means are similar but here they are bolted together.

As has been seen above, the means of absorbing energy, in the form for example of a torsion bar, is of an elastic nature.

If this means of absorbing energy is not to give it out again after the impact, i.e. if we wish to prevent abrupt return of the seat back backwards after it has been propelled forwards by the weight of the occupant in the case of a front impact on the vehicle, such return possibly proving harmful both for the seat occupant and for any rear-seat passenger who is also propelled forwards, to where the seat back violently returns, it is desirable to limit the amplitude of displacement of the seat back. Mechanical blocking of the torsion bar for example by a peg will make it possible to absorb the force without returning it and thus avoid this catapult effect.

Another possible solution consists of suitable heat treatment of only one part of the torsion bar, for example its central part or its ends or its central part and one end; the untreated, more malleable parts then deform permanently during twisting of the bar, thus providing the non-return function; of course, this may or may not be combined with arrangements wherein the tubular bar has a variable thickness or a variable diameter.

Figure 21:
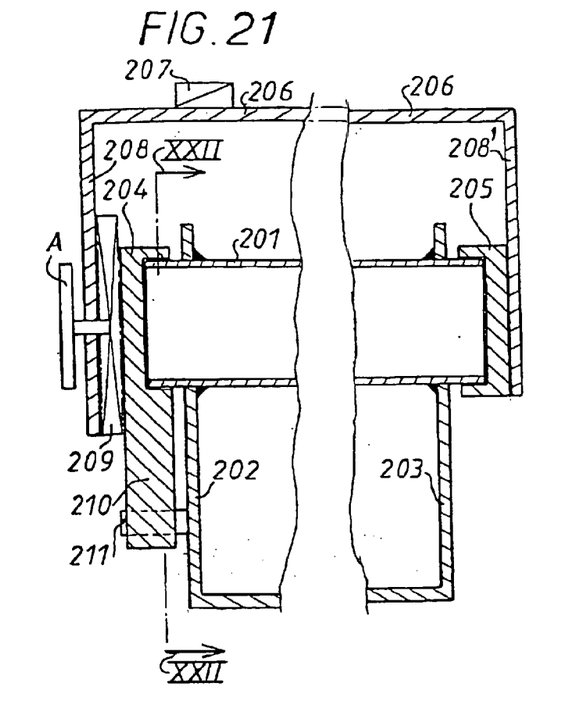
FIGS. 21 and 22 are schematic views of one embodiment provided with an energy absorbing means operating in bending, FIG. 22 being a section through XXII—XXII in FIG. 21.
Figure 22:
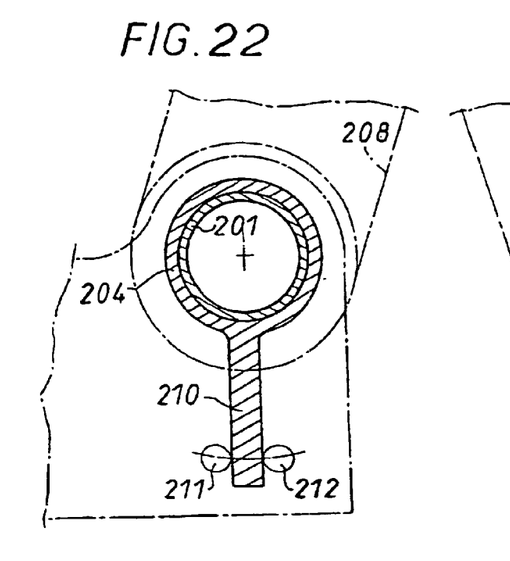

FIGS. 21 and 22 are, respectively, schematic front and side views of one embodiment of the seat according to the invention. A tubular crosspiece 201 is joined to the seat side members 202, 203, whereas the bearings 204, 205 carried by the back part 206 turn on the projecting ends of the tubular crosspiece 201 forming a pivot. On the back part, the zone for anchorage of the safety belt is labelled 207.

On the arm 208 of the back part that is nearest to the anchorage zone 207, there is fixed, by means of a slope adjusting the mechanism 209 operable at A, the bearing 204, which may or may not form part of the mechanism 209, which is equipped here with a means of absorbing energy by bending comprising a radial extension 210 forming a lever fitted without play between two pins 211, 212 provided for this purpose on seat side member 202.

The other bearing 205 is fixed directly on the second arm 208' of the seat back.

In this case, therefore, we have a single means of absorbing energy 210 associated only with arm 208 of the back part that is closest to the anchorage zone 207.

Figure 23:
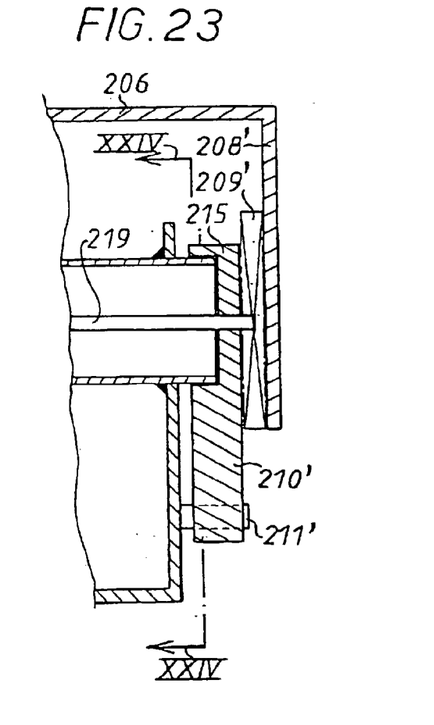
FIGS. 23 and 24 are views of one variant of embodiment, FIG. 24 being a section through XXIV—XXIV in FIG. 23.
Figure 24:
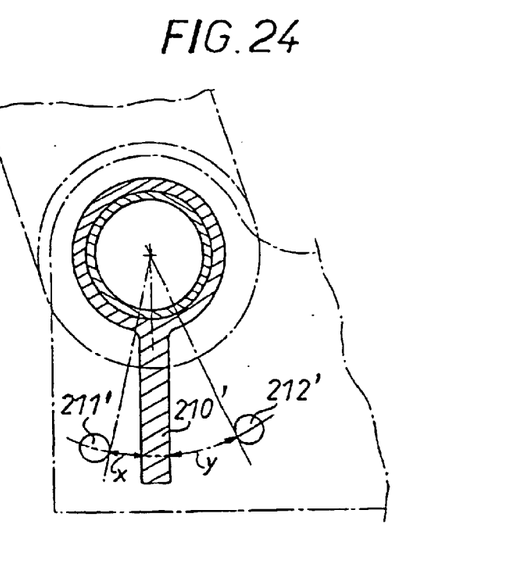

In the variant shown in FIGS. 23 and 24, the second arm 208' of the seat back is also equipped with a mechanism 209' for adjusting the slope of the seat back coupled to the other mechanism 209 via a coupling spindle 219. The bearing 215, which then replaces the previous bearing 205, is in its turn equipped here with a lever 210', similar to the lever 210, constituting a second means of absorbing energy by bending but this time operating with an amount of play, owing to the angular offset of the stop pins 211' and 212' of values x and y chosen respectively for cases of front and rear impact.

Figure 25:
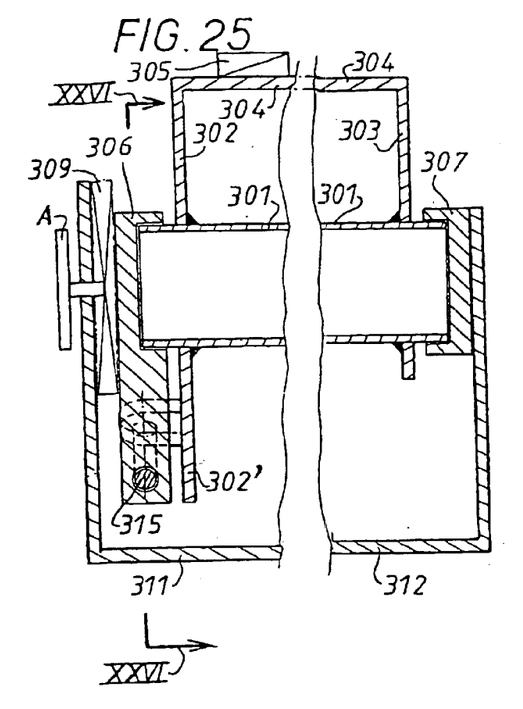
FIGS. 25 and 26 are similar views of an embodiment provided with an energy absorbing means employing compression springs, FIG. 26 being a section through XXVI—XXVI in FIG. 25.
Figure 26:
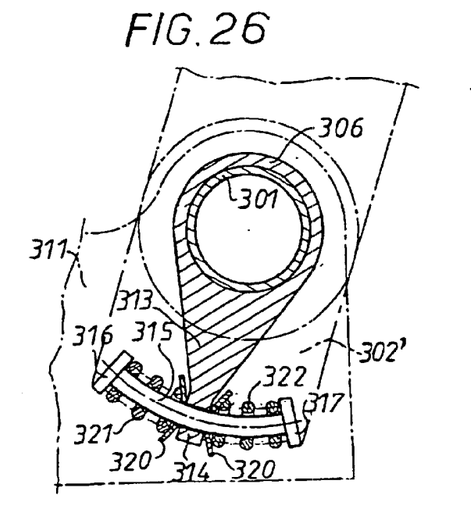

In the embodiment shown in FIGS. 25 and 26, there is a tubular crosspiece 301 joined solidly to the two arms 302, 303 of a seat back frame 304 where we find the location 305 of the belt anchorage zone.

The protruding ends of the tubular crosspiece 301 form journals in bearings 306, 307 that are joined to the seat side members 311, 312. The bearing 306 is joined to the side member 311 via a mechanism 309 for adjusting slope, the operation of which is shown schematically at A.

The bearing 306 that is closest to the anchorage zone 305 is equipped with the means for absorbing energy comprising in this case a rigid radial arm 313 terminating at a hand 314 that is able to move along a guide bar 315 in the arc of a circle with its centre on the axis of the tubular crosspiece 301 and extending between two stop plates 316, 317 cantilevered on an extension 302' of the arm 302 of the seat back. The hand 314 is normally held at the mid-point of guide bar 315 by two helical springs 321, 322 bearing respectively on the stops 316, 317, on the one hand, and on the hand 314, on the other hand, with a non-return locking washer 320 of a known type mounted on each side of the hand. The springs 321, 322 are subjected to a predetermined compressive stress and are calculated to withstand, by flattening in the case of an impact, a driving torque that is also predetermined. If for example a front impact has the effect of flattening the spring 321, the latter is held in the flattened state by the corresponding washer 320 which, by gripping—on account of its configuration—the guide bar 315, remains immobilized.

Figure 27:
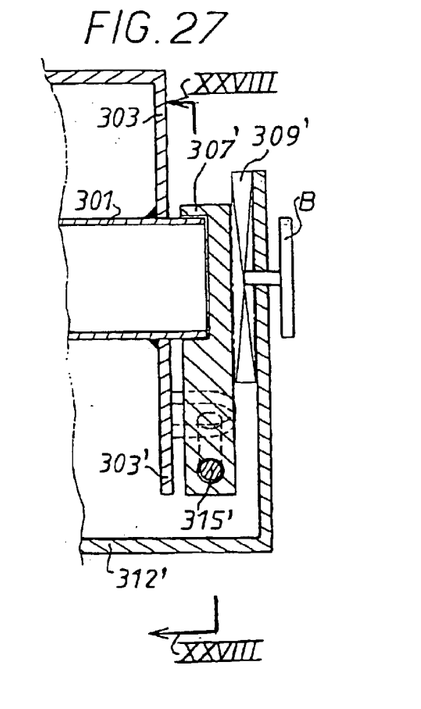
FIGS. 27 and 28 show another variant, FIG. 28 being a section through XXVIII—XXVIII in FIG. 27.
Figure 28:
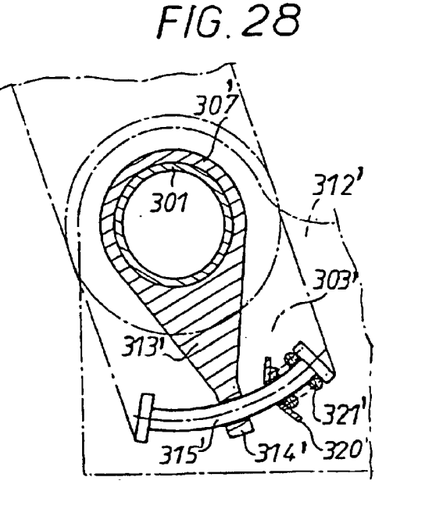

In the variant shown in FIGS. 27 and 28, a second adjusting mechanism 309' operable at B being provided between the bearing 307' and the seat side member 312', a second energy absorbing device similar to the preceding is provided to complement the latter with delayed action: thus, there is a rigid arm 313' with a hand 314' on a guide bar 315' carried by the extension 303' of the arm 303 of the seat back, but with a single helical spring 321' that is intended to add its effect to that of the spring 321 if required in a second stage of absorbing a front impact.

As will have been understood, any type of absorbing means arranged between bearing and pivot is suitable, whether of the mechanical, hydraulic, pneumatic, electric or other type.

What is claimed is:

1. A motor vehicle seat designed to receive a safety belt and comprising a seat part (10) and a back part (20) on either side of a hinging zone, each of said parts (10, 20) comprising a frame with two arms (12-13, 22-23) terminating at the hinging zone, the two arms (12-13, 22-23) respectively forming seat side members (12, 13) and back upright members (22, 23), the ends of the two arms (22, 23) of one part (20) of said parts and the ends of the two arms (12, 13) of the other part (10) being each rotatably mounted by means of a pivot (24, 25) in a bearing (14, 15), the pivot (24, 25) being carried by one part (20) and the bearing (14, 15) by the other part (10), an energy absorbing means (40) being provided between at least one pivot (25) and its corresponding bearing (15), wherein a stiffening tubular crosspiece (30) is arranged between the pivots (24, 25) carried by the ends of the arm (22, 23) of said one (20) of the parts and the energy absorbing means (40) is arranged within said crosspiece (30).

2. A seat according to claim 1, characterized in that the energy absorbing means (40) has at least one elastic element.

3. A seat according to claim 2, characterized in that the energy absorbing means (40) has at least two elastic elements (43,44).

4. A seat according to claim 3, characterized in that the two elastic elements (43, 44) that are designed to come into operation, one (43) instantly without play, the other (44) being delayed further to a displacement determined by an amount of play.

5. A seat according to claim 4, characterized in that the one of the elastic elements (44), having delayed operation, is given a certain amount of play in one direction and a different amount of play in another direction.

6. A seat according to claim 1, characterized in that the ends of the two upright members (22, 23) of the back part (20) being joined by the stiffening crosspiece (30) whose ends, extending to the outside of the upright members (22, 23) of the back part (20), form pivots (25, 26) for hinging in two bearings (14, 15) housed on said ends, each of said bearings has, in relief on its external face, an engaging means (38) that is designed to cooperate by complementarity of shape with a receiving means (39) arranged in the hinging zone of the corresponding seat side member (12, 13).

7. A seat according to claim 1, characterized in that the energy absorbing means is an elastic element designed to undergo a permanent deformation in case of impact.

8. A seat according to claim 7, characterized in that the elastic element is divided into at least two parts, at least one of these parts having undergone a treatment to modify its elastic limit.

9. A seat according to claim 1, characterized in that the absorbing means has at least one torsion bar (40) with one (41) of its ends fixed in one (15) of the bearings and connected by a coupling block (50) to the tubular crosspiece (30).

10. A seat according to claim 9, characterized in that the torsion bar (40) is of non-circular section.

11. A seat according to claim 10, characterized in that the other end (42) of the torsion bar (40) fits in a housing of similar shape but of larger dimensions so as to block said end (42) in rotation only beyond a certain angle of rotation.

12. A seat according to claim 11, characterized in that the other end of the torsion bar (40) fits in a housing (16) of cross-section delimited by two squares centered on an axis and with an angular offset with a predetermined displacement angle, the rotational displacement of each vertex of the cross-section of the bar being delimited by two flat bearing surfaces (17) connected along a circular arc (18) of diameter at least equal to a diagonal of the bar (40).

13. A seat according to claim 10, characterized in that a difference provided between the distances separating the coupling block (50) from the two ends (41, 42) of the bar (40) distributes stresses applied on the seat side members (12, 13).

14. A seat according to claim 13, characterized in that sleeves (146) mounted on the torsion bar (40) are designed to guide the coupling block (50).

15. A seat according to claim 9, further comprising sleeves inserted one of in the tubular crosspiece (30) and on the torsion bar (40), which limit axial displacements of the coupling block (50).

16. A seat according to claim 9, characterized in that the tubular crosspiece (30) has at least one helical rail (31, 131) cooperating with at least one corresponding groove (51) arranged on the coupling block (50), the torsion bar (40) blocking any relative rotary motion between said block (50) and said bar (40) but permitting their free relative sliding.

17. A seat according to claim 16, characterized in that said at least one helical rail (31, 131) extends over a fraction of the length of the crosspiece (30).

18. A seat according to claim 17, characterized in that one of the ends (132) of the rail (131) is configured as a stop limiting axial displacement of the coupling block (50).

19. A seat according to claim 16, characterized in that the coupling block (50) having a tapped through-hole (52), a screw (60) parallel to an axis (1), free to rotate but blocked in translation and accessible by at least one of its ends, constitutes a means for fine adjustment of a slope of the back part (20).

20. A seat according to claim 19, characterized in that said screw (60) is designed to be operated by at least one of its ends.

21. A seat according to claim 19, further comprising a device for manual selection of the slope of the back part (20) interposed between at least one (15) of the bearings carrying said one (20) of the parts and the end of the corresponding arm (13) of said other part (10).

22. A seat according to claim 21, characterized in that the device for selecting the slope of the back part (20) has a limited number of positions for angular blocking, and the means for fine adjustment is designed for continuous coverage of a range of adjustment over an angular extent greater than a difference between two successive positions for angular blocking of the selecting device.

* * * * *

UNITED STATES PATENT AND TRADEMARK OFFICE
CERTIFICATE OF CORRECTION

PATENT NO. : 6,779,841 B2
DATED : August 24, 2004
INVENTOR(S) : Jean-Pierre Eckendorff It is certified that error appears in the above-identified patent and that said Letters Patent is hereby corrected as shown below:

Title page,
Item [30], Foreign Application Priority Data, change "Apr. 8, 2000" to -- Aug. 4, 2000 --.

Signed and Sealed this

Fifteenth Day of February, 2005

JON W. DUDAS
*Director of the United States Patent and Trademark Office*